(12) United States Patent
Luongo

(10) Patent No.: US 6,340,388 B1
(45) Date of Patent: *Jan. 22, 2002

(54) STRENGTHENED, LIGHT WEIGHT WALLBOARD AND METHOD AND APPARATUS FOR MAKING THE SAME

(75) Inventor: Joseph S. Luongo, Kingman, AZ (US)

(73) Assignee: Advanced Construction Materials Corp., Kingman, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/547,615

(22) Filed: Apr. 12, 2000

Related U.S. Application Data

(63) Continuation-in-part of application No. 09/471,448, filed on Dec. 23, 1999, which is a continuation-in-part of application No. 09/374,589, filed on Aug. 13, 1999, now Pat. No. 6,251,979, which is a continuation-in-part of application No. 09/195,438, filed on Nov. 18, 1998, now abandoned.

(60) Provisional application No. 60/139,618, filed on Jun. 17, 1999.

(51) Int. Cl.⁷ ......................... C04B 38/08; C04B 28/14
(52) U.S. Cl. ..................... 106/675; 106/677; 106/680; 106/698; 106/778; 156/39; 156/45; 156/346; 428/449; 428/537.7; 524/423; 524/444
(58) Field of Search ............................... 106/672, 675, 106/677, 680, 698, 778; 156/39, 45, 346; 524/423, 444; 428/449, 537.7

(56) References Cited

U.S. PATENT DOCUMENTS

| | | | |
|---|---|---|---|
| 2,803,575 A | 8/1957 | Riddell et al. | |
| 2,809,949 A | 10/1957 | Orth, Jr. | |
| 3,022,184 A | 2/1962 | Kerr | |
| 3,103,444 A | 9/1963 | Cotts | |
| 3,190,787 A | 6/1965 | Muller et al. | |
| 3,305,518 A | 2/1967 | Jacacki et al. | |
| 3,414,467 A | 12/1968 | Ferrara | |
| 3,720,633 A | 3/1973 | Nickerson | |
| 3,984,596 A * | 10/1976 | Failmezger | 428/144 |
| 3,988,199 A * | 10/1976 | Hillmer et al. | 162/101 |
| 4,148,660 A * | 4/1979 | Lankard et al. | 106/675 |
| 4,148,781 A | 4/1979 | Narukawa et al. | |
| 4,159,302 A * | 6/1979 | Greve et al. | 264/333 |
| 4,174,230 A | 11/1979 | Hashimoto et al. | |
| 4,283,229 A | 8/1981 | Girg et al. | |
| 4,297,311 A | 10/1981 | Sherman et al. | |
| 4,313,997 A * | 2/1982 | Ruff et al. | 428/220 |
| 4,328,178 A | 5/1982 | Kossatz | |
| 4,343,127 A | 8/1982 | Greve et al. | |
| 4,369,064 A | 1/1983 | von Bonin | |
| 4,392,896 A | 7/1983 | Sakakibara | |
| 4,433,020 A | 2/1984 | Narukawa et al. | |
| 4,483,946 A | 11/1984 | Barnes et al. | |
| 4,514,471 A | 4/1985 | Sugimoto et al. | |
| 4,686,253 A * | 8/1987 | Struss et al. | 524/44 |
| 4,695,494 A | 9/1987 | Fowler, Jr. et al. | |
| 4,810,569 A | 3/1989 | Lehnert et al. | |
| 5,256,222 A * | 10/1993 | Shepherd et al. | 156/41 |
| 5,309,690 A | 5/1994 | Symons | |
| 5,336,318 A * | 8/1994 | Attard et al. | 106/780 |
| 5,350,554 A | 9/1994 | Miller | |
| 5,422,387 A | 6/1995 | Toms et al. | |
| 5,437,722 A | 8/1995 | Borenstein | |
| 5,480,923 A | 1/1996 | Schmid et al. | |
| 5,482,551 A * | 1/1996 | Morris et al. | 106/780 |
| 5,534,059 A | 7/1996 | Immordino, Jr. | |
| 5,536,764 A | 7/1996 | Nguyen et al. | |
| 5,558,710 A | 9/1996 | Baig | |
| 5,582,670 A | 12/1996 | Andersen et al. | |
| 5,648,154 A | 7/1997 | Koh et al. | |
| 5,653,797 A * | 8/1997 | Patel | 106/781 |
| 5,676,905 A | 10/1997 | Andersen et al. | |
| 5,720,913 A | 2/1998 | Andersen et al. | |
| 5,723,226 A * | 3/1998 | Francis et al. | 428/688 |
| 5,725,656 A | 3/1998 | Shimanovich et al. | |
| 5,746,822 A * | 5/1998 | Espinoza et al. | 106/785 |
| 5,749,954 A | 5/1998 | Law et al. | |
| 5,800,756 A | 9/1998 | Andersen et al. | |
| 5,810,961 A | 9/1998 | Andersen et al. | |
| 5,827,457 A | 10/1998 | Tseng | |
| 5,830,305 A | 11/1998 | Andersen et al. | |
| 5,830,548 A | 11/1998 | Andersen et al. | |
| 5,874,486 A | 2/1999 | Bastioli et al. | |
| 5,879,446 A * | 3/1999 | Patel et al. | 106/781 |
| 5,879,825 A * | 3/1999 | Burke et al. | 106/802 |
| 5,886,306 A | 3/1999 | Patel et al. | |
| 5,888,322 A * | 3/1999 | Holland | 156/39 |
| 5,922,447 A * | 7/1999 | Baig | 106/780 |

\* cited by examiner

*Primary Examiner*—Anthony Green
(74) *Attorney, Agent, or Firm*—Whiteford, Taylor & Preston; Gregory M. Stone, Esq.

(57) ABSTRACT

A novel wallboard composition is disclosed comprising a unique combination of synthetic binders selected for their ability to establish a strengthened permanent bond in the final dry state for use in a wallboard composition comprising primarily gypsum, and in a wallboard composition comprising an expanded mineral such as Perlite which largely reduces the amount of gypsum over current gypsum wallboard formulations, thus reducing the weight while maintaining the strength of the wallboard structure. In a preferred embodiment, the lightweight, strengthened wallboard of the present invention also comprises an optional covering veneer that is applied to the top ply of the face paper to provide increased strength, moisture resistance, and fire retardency, and the back paper top ply is treated to provide increased flexural strength. Additionally, this invention relates to the unique manufacturing process to produce the wallboard composition of the present invention in order to create a lightweight, strengthened, moisture resistant, and fire retardant wallboard used to cover walls and ceilings in construction applications. Still further, this invention relates to the apparatus for manufacturing the wallboard composition of the present invention, including a method and apparatus for economically converting a standard gypsum wallboard manufacturing facility into a facility for manufacturing wallboard of the present invention.

16 Claims, No Drawings

US 6,340,388 B1

STRENGTHENED, LIGHT WEIGHT WALLBOARD AND METHOD AND APPARATUS FOR MAKING THE SAME

CROSS-REFERENCE TO RELATED APPLICATIONS

The present application is a Continuation-in-Part Application of U.S. patent application Ser. No. 09/471,448, filed Dec. 23, 1999 which application is a Continuation-in-Part Application of U.S. patent application Ser. No. 09/374,589 filed Aug. 13, 1999, U.S. Pat. No. 6,251,979 which application is based upon and gains priority from U.S. Provisional Patent Application Ser. No.: 60/139,618, filed: Jun. 17, 1999 by the inventor herein and entitled "IMPROVED WALLBOARD AND METHOD AND APPARATUS FOR MAKING THE SAME," and which application is also a Continuation-in-Part Application of U.S. patent application Ser. No. 09/195,438, filed Nov. 18, 1998, abandoned by the inventor herein and entitled "LIGHT WEIGHT FIRE AND MOISTURE RESISTANT WALLBOARD."

BACKGROUND OF THE INVENTION

1. Field of the Invention

This invention relates to new "drywall" compositions and methods for making the same that are useful in the manufacture of wallboard for covering walls and ceilings in construction applications. More particularly, this invention is directed to a novel wallboard composition comprising a unique combination of synthetic binders selected for their ability to establish a strengthened permanent bond in the final dry state, in combination with gypsum and an expanded mineral such as Perlite. Utilizing such synthetic binders provides an increased strength to the wallboard core, enabling lighter-weight Perlite to replace at least a portion of the heavier gypsum traditionally used in wallboard compositions. Moreover, the synthetic binders disclosed herein uniquely cross-link with the expanded mineral to form a much stronger bond between the constituent components of the wallboard core material than that which has been available in previously utilized or known wallboard products. In a preferred embodiment, the lightweight, strengthened wallboard of the present invention also comprises a covering veneer that is applied to the top ply of the face paper to provide increased strength, moisture resistance, and fire retardency, and the back paper top ply is treated to provide increased flexural strength. Additionally, this invention relates to the unique manufacturing process to produce the wallboard composition of the present invention in order to create a lightweight, strengthened, moisture resistant, and fire retardant wallboard used to cover walls and ceilings in construction applications.

2. Description of the Background

Perlite (expanded) can be graded by density in pounds per cubic foot, and classified by product number or trade name for producer and user identification. The expanded product can weigh as little as 2 pounds per cubic foot, but the most widely used bulk-density grade range is from 7 to 15 pounds per cubic foot. The range of expanded Perlite utilized in the wallboard composite core of the present invention is 4 to 10 pounds per cubic foot, but preferably Perlite weighing 4 pounds per cubic foot is utilized in the formulation of the present invention. It has been found that the more friable cryogenic grades in the 3 to 4 pound range are favorable over the heavier grades ranging from 5 to 10 pounds per cubic foot. Grades typical to this range include concrete, plaster, and cavity fill or masonry. The particle size ranges from 100 to 2,000 microns, and preferably from 200 to 1000 microns. Preferably, the expanded Perlite will have a particle size ranging from no larger than 10 mesh sieve size and no smaller than 200 mesh sieve size measured on standard screen scale with 25% measuring 30 minus and the remaining 75% measuring 30 plus on a sieve analysis. The particle size of the preferred expanded Perlite is directly related to the strength of the wallboard core in the aspect of fusion. Particles that are too large tend to space gypsum crystal growth too far apart, and particles that are too small don't allow enough area for the gypsum crystal to fuse onto.

DESCRIPTION OF THE PRIOR ART

The use of calcium sulfate hemihydrate $C_ASO_4.2H_2O$ in the manufacture of gypsum wallboard and its related products has predominately been unchanged for over half a century. It has long been a conventional practice to finish the interiors and exteriors of buildings with gypsum core construction materials such as wallboard, lath, or sheathing. In general, these boards comprise essentially a core of set interlaced gypsum crystals disposed between fibrous, especially paper, liner sheets. After the gypsum slurry has set (i.e., reacted with the water from the aqueous slurry) and dried, the sheet is cut into standard wallboard sizes. Methods for the production of gypsum drywall are described, for example, in the Kirk-Othmer Encyclopedia of Chemical Technology, Second Edition, 1970, Vol. 21, pages 621–24, the disclosure of which is hereby incorporate herein by reference.

It has been known to incorporate certain additional agents in the core of gypsum wallboard. These have included, for example, foam aggregate wherein a foam has been shredded to a rough consistency and then incorporated into the gypsum slurry prior to forming and setting thereof. Also, expanded mineral fillers such as perlite and/or vermiculite have been incorporated into the gypsum slurry in small amounts from 0.5 to 10 percent, in addition to organic adhesives such as starch or dextrin, or other fibers. Other agents have also been added, including simple chemicals which react within the gypsum slurry to form gasses. For example, carbonates are added to yield $CO_2$ within the slurry; likewise, other air entraining agents, such as soap foams, may be employed to enable whipping air into the gypsum slurry during mixing.

Unfortunately, however, the amount of air or gas cells, or voids, which can be incorporated is limited, because the strength of the composite wallboard core is reduced when the amount of air cells is increased beyond a certain point. Likewise, the ability of the board to withstand a nail pull through the board is adversely effected by excessive air entraining. Additionally, historically expanded minerals were not added in gypsum wallboard beyond 2 to 3 percent because strength tests were significantly reduced, in both nail pull and flexural break tests, according to ASTM C36 and ASTM C473. While it has been an intention of individual inventors and major manufacturers to produce a lightweight, strengthened, and essentially improved wallboard product over current formulations, the problem of providing a wallboard product with increased strength while reducing its weight at a relative low cost has not been practically realized, either in re-engineering the wallboard itself or the manufacturing process thereof. Many combinations and compositions have been tried and tested in the past, but many remain unutilized due to impractical applications and/or significant increases in production costs. Reduced weight and density boards should meet or exceed industry standards and have strengths equal to or greater than their heavier counterparts according to ASTM standards. Such lightweight wallboard compositions should be able to be manufactured using conventional high-speed manufacturing apparatus and not suffer from other negative side effects of a completely different manufacturing process.

The addition of synthetic binders has very recently been attempted as disclosed in U.S. Pat. No. 5,879,825 to Burke et al.; however, the engineering and chemical research in various combinations of complex chemical formulations and combinations thereof has been quite limited. Additionally, Burke et al. fails to address the environmental concerns of noxious fumes under fire engineering standard ASTM testing E119, and cost considerations limited the amount of acrylic polymer to 1 to 2 percent, such that a polymer having a minimal cross-linking performance resulted. Further, while the use of Perlite as an antidessicant to prevent the dehydration of gypsum crystals formed during setting of the core composition is disclosed, no consideration is given to introducing an expanded mineral, such as perlite, as a substitute for gypsum as one of the structural foundations of the wallboard core, nor the specific need for a synthetic binder composition for establishing a complete crosslinking between the constituent elements of the wallboard core in order to create a molecular change within the strengthening agent, which molecular change is in turn required to completely bond a reduced amount of gypsum with the other components of the wallboard core. Moreover, the chemical properties of the polyvinyl acetate emulsion of the instant invention, containing block copolymers of partially hydrolyzed polyvinyl alcohol, and the stabilized polyvinyl acetate particles in aqueous solution of the instant invention are very chemically different from the disclosed components of Burke et al. The polyvinyl acetate emulsion of the instant invention comprises distinct chemical formulations and exhibits distinct properties from those either taught or suggested by Burke et al., including being manifested in a water soluble, lower cost, aqueous solution which is milky white in color, chemically designed to be easily diluted in water, of higher glass transition temperature (Tg) values, having unique percentages of partially hydrolyzed polyvinyl acetates co-blocked and stabilized with specific molecular weight polyvinyl alcohol derivatives to produce a lower cost, easily dispersant binder that chemically cross-links with boron and starch, and which has less kiln stack emissions of similar quantities, and thus is more environmentally friendly.

Other attempts have been made in the prior art to provide adhesive compositions for use in bonding cellulosic and other porous materials. For example, U.S. Pat. No. 3,720,633 to Nickerson discloses a polyvinyl alcohol-based adhesive composition for use in paper converting applications. However, once again, no mention or suggestion is made of the need for a specific synthetic adhesive composition able to establish a sufficient cross-linking between its components to bind with gypsum and/or an expanded mineral to create a core material having the strength characteristics necessary to utilize the material as a wallboard sheet while having a reduced weight over compositions that have been previously known.

Still further, U.S. Pat. No. 5,534,059 to Immordino, Jr. discloses a machinable plaster composition comprising a polymer-modified, gypsum based material, including a water redispersable powder polymer binder. However, in this instance, the polymer binder is used to produce a much more rigid, and thus easily machinable, plaster blank for use in conjunction with computer aided milling machines than previous compositions, and once again fails to disclose or suggest any combination which might be used to produce a strengthened yet lightweight wallboard having a synthetic binder which is fully cross-linking in order to establish a rigid bond with the gypsum and/or expanded mineral constituents of the wallboard core.

It would therefore by highly advantageous to provide a high strength, lightweight wallboard product which reduces the need for gypsum in the wallboard composition, and which utilizes a synthetic binder composition that enables a complete cross-linking of the constituent elements of the wallboard core to form a rigid structure with the structural integrity to withstand the structural requirements of traditional wallboard products. Such wallboard products should meet industry requirements, and likewise have a strength at least equal to previously known wallboard products while reducing the weight of the finished wallboard sheet.

SUMMARY OF THE INVENTION

It has been discovered that a composition consisting essentially of a unique combination of synthetic binders selected for their ability to establish a permanent bond in the dry state, combined with an expanded mineral (e.g., Perlite and crushed Perlite), organic binding adhesives, drying agents, and hardeners, all contained within a covering of treated moisture and heat resistant paper material, produces an improved lighter-weight, strengthened wallboard product. The technology of the present invention utilizes an expanded mineral which physically becomes part of the composite matrix due to the complex formulation of binders attaching themselves to the mineral, instead of the mineral only acting as a filler.

First, the present invention allows for a wallboard composition that is significantly lighter in weight (up to fifty percent lighter) than current traditional heavy gypsum wallboard formulations. This reduced weight also results in transporting lighter loads, in turn reducing transportation costs. Further, job site labor costs are reduced by enabling the workers to handle lightened loads, such that the installation process is made easier and less costly. Similarly, the potential for heavy wallboard related injury accidents to the tradesmen that install the wallboard are reduced.

Yet another benefit of the strengthened wallboard of the instant invention is the reduction in the amount of board breakage and losses due to manual or machine transport to the installation site, due to the fact that the composition of the instant invention provides the wallboard with greater flexibility than has been known in previous wallboard compositions.

Still further, the wallboard composition of the instant invention exhibits equal or greater strength than current heavy gypsum wallboard, with improvements in moisture resistance and flame resistance that exceeds current industry standards. This lightweight and strength factor equates to decreased structural support load bearing and lessens the total support strength required in any project, in turn further reducing overall construction costs.

The specific constituents of the wallboard core (as set forth in detail below) have been found to improve upon the overall structural strength of the wallboard, lighten its weight, decrease the amount of airborne particulates during breakage, decrease its brittleness, and expand its flexibility.

The attempted addition of synthetic binders in the past to wallboard compositions have reduced the ability to cut the finished wallboard sheet during installation with a utility knife. However, the composition of the instant invention was developed after extensive testing and analysis of numerous chemical combinations, with extensive chemical technical research and testing to realize a brittle cross-linking complex polymer that combines and fuses with the mineral and expanded mineral, that is easily cut and snapped with a utility knife as applied in standard construction industry use.

A polyvinyl acetate emulsion or vinyl acetate homopolymer emulsion were tested and found favorable for use in the binder of the instant invention. Vinyl acetate emulsions tested were selected and preferred over acrylic or other petrochemical-based emulsions or liquid plastics for several specific reasons. First, the most crucial practical factors in selecting the preferred type of adhesive are performance of the adhesive in binding the wallboard core, and cost relative to that performance. Such cost factors include both the cost of the base components, such as vinyl acetate monomer (VAM) (which today is preferably produced from ethylene) that make up the adhesive, and the cost to make the final product. It was found that vinyl acetates provide the lowest cost while maintaining assurance of high adherence and coherence capabilities to attach to the minerals in the wallboard core, namely, gypsum and/or perlite. Secondly, a deliberate effort was made to determine and utilize a low cost, final stage, brittle-type plastic in emulsion or liquid initial state, that when hardened would have the ease of a clean snap when cut with a utility knife. It was discovered that the vinyl acetate adhesive family performed superior to sodium silicates in meeting these requirements, even though sodium silicates were lower in overall cost. Thirdly, test results proved that water solubility of the adhesive and ease of dispersion into the final core composite was crucial to fabricating the wallboard without paper blows.

Also, it was discovered that board flexibility during actual board installation, or during the manufacture of the board as it travels over rollers and curved rises in and out of the drying kilns was improved through the use of more plastic adhesives (such as vinyl acetate) than starch as the binder. While vinyl acetates of all types were found to be less costly and performed well, vinyl acetate emulsions with 0.10% to 30% polyvinyl alcohol were further preferred and found to provide unforseen benefits over powdered polyvinyl acetates. First, vinyl acetate emulsions containing polyvinyl alcohol are available at far less cost (approximately one third) than powdered polyvinyl acetates. Further, vinyl acetate emulsions when properly added and diluted for quick dispersion in the metered water or water solution feeds, prior to entrance into the gypsum slurry mixer, dispersed and performed better than powdered polyvinyl acetates, thus simplifying the manufacturing process and reducing costs caused by flawed boards. Better results in terms of reactivity, dispersion, and ease of mixing occurred in test samples when the vinyl acetate emulsions were strengthened and stabilized with polyvinyl alcohol. It was discovered that the optimum molecular weight of the preferred polyvinyl alcohol selected to strengthen and stabilize the vinyl acetate emulsion is a function of the type of gypsum stucco prepared, and the length of time the final vinyl acetate emulsion needed to be stabilized. In final prepared gypsum stuccos that had higher percentages of certain clays (i.e., above 1% of clays commonly found in some gypsum deposits) naturally occurring in or with the gypsum ore, lower molecular weight polyvinyl alcohols exhibited better results with less initial thickening of the wet gypsum slurry mix.

Environmental factors and concerns must also be evaluated when selecting the preferred adhesive, such as noxious fumes emitted in burning test samples and kiln stack emissions while heating and drying the board during the manufacturing process. Plant operational environmental concerns and plant kiln stack emissions are critical factors for manufacturers to consider in evaluating the use of synthetic adhesives. Acrylics and polyurethanes exhibited higher stack emissions, noxious fumes in burn tests, and presented more environmental operational concerns over similar percentages of vinyl acetate emulsions.

Additionally, vinyl acetates reacted well and cross-link in the presence of boron with starches to create a final tacky binder, at the proper percentages set forth below, that forms a brittle plastic excellent for binding the core of the wallboard product in such a way as to maintain superior strength characteristics while reducing the overall weight of the wallboard.

It has also been determined that the addition of small amounts of accelerators or strengthening agents described below can be added to the final polyvinyl acetate emulsion to increase strength and final composite set performance. To describe this macroscopically, the binder is diluted in the processed water to disperse throughout the wet gypsum and perlite slurry in the pin mixer. An accelerator or strengthening agent is added to the back side of the gypsum slurry pin mixer, to begin to chemically increase the set of the binder once the formed wallboard is proceeding downstream to the rotary knife. Optimally, the initial set time of the board is a decreased such that the wallboard can be cut in less time. Thus, the board line can be run faster producing more wallboard in a shorter period of time. Potassium or other alkali elements or compounds can be added at 0.001% to 3% of the total wallboard wet weight at the last stages to increase the rate of the set time of the binder and ultimately decrease the initial set of the board. While Potassium Sulfate has been utilized to decrease the initial set time of the green wallboard prior to the knife, too high or too small amounts can actually burn the gypsum crystals and create a "punky" or powdery final wallboard that has lost its strength. The binder (vinyl acetate emulsion) reacts with the accelerator (potassium sulfate) to retard or even eliminate the burning of the gypsum crystals. In the case of adding the potassium sulfate, it is important to mix it into the vinyl acetate emulsion solution just prior to entering the solution into the pin mixer so that these compounds begin to react first.

Actual plant manufacturing test runs of the wallboard compositions described herein were conducted for several hours each, and using a variety of gypsum ore and gypsum stucco preparation methods. The test runs showed improved ASTM test results at each run. The process of introducing and adding sufficient amounts of the synthetic binder into the final gypsum stucco was successfully completed during each test run, such that there were not problems in the manufacturing process of making the wallboard. However, improved results occurred when the binder was diluted in the metered water or other prepared water solutions, for direct feed prior to the gypsum slurry mixer. Higher ASTM lab test results occurred when utilizing the optimum design combinations and percentages set forth in the examples below of vinyl acetate and polyvinyl alcohol emulsions, with each particular type of gypsum stucco supplied during the four test runs. Thus, by optimizing the final polyvinyl acetate homopolymer or polymer emulsion, optimum test results were achieved in both the test lab and in actual manufacturing test samples.

Optionally, reinforcing fibers, fire retardants, water repellents, and other water proofing materials may be part of the composition. Further, the technology of the present invention allows for decreased set times from the pin mixer to the knife in laboratory testing, which in turn increases boardline manufacturing speeds far beyond what is currently being realized. As manufacturing speeds increase, so does production, enabling greater amounts of wallboard to be produced to meet the current demand. This complex formulation of binders can be seen to be utilized in a wide variety of other building materials as well.

The improved, strengthened core material of the instant invention also provides increased compression, shear, and tension loading test results in comparison with the conventional non-reinforced gypsum drywall. ASTM Test Standard C79 standard specifications for gypsum sheathing board require that specimens shall surpass an average surface water absorption of not more than 1.6 g after 2 hours of elapsed time (Section 5.1.7). While gypsum wallboard is required to meet the above ASTM standards, moisture resistance and adverse weather conditions have been long-term problems with gypsum drywall. The improved wallboard of the instant invention comprises an improved moisture resistant cover and core material that far surpasses ASTM C79-5.1.7. Thus, the present invention improves the structural strength, moisture resistance, and weight factors in the design of a new wallboard or ceiling board to be utilized as a construction material.

Moreover, current wallboard core formulations, once dried, have common micro-cracks, form more brittle core composites, and exhibit less tolerant processed board flexibility. Paper fibers, or other synthetic fibers, have been utilized more in the past to hold the core composite together, yet have been insufficient to stop board drying over time, and increase short or long term micro-cracking and ultimate core breakdown or spot load failure. Thus, the development of the synthetic adhesive technology of the instant invention has developed critical improvements to board flexibility, moisture retention, and long term, sustained and improved strength.

A preferred embodiment of the invention is further directed to a method for producing expanded Perlite wallboards of a thickness not less than ¼ inch and not greater than 1 inch comprising the steps of adding starch, boric acid, foamer, gypsum, and a latex vinyl acetate emulsion with water to expanded Perlite to form a composition; the aqueous slurry of settable Perlite is enveloped between two high quality paper cover sheets comprised of recycled virgin pulp and formed into a board; directing the continuous board away from the forming apparatus to a cutting knife where it is cut to desired length; and finally drying the board in a high temperature kiln at temperatures ranging from 75° C. to 325° C. Optionally, the process further includes the steps of forcing hot air to an encapsulated section of board line, starting the curing process prior to the board reaching the board cutting knife.

As previously mentioned, gypsum board manufacturing is a complex process from the collection of the gypsum rock to the production of the completed wallboard. However, the improved wallboard product of the instant invention, as described more fully in the examples below, offers increased wallboard production capacity from a given gypsum supply over traditional gypsum wallboard products and methods of manufacture.

Yet another improvement of the improved wallboard product of the present invention comprises the environmental improvements resulting from a reduction of the half-life of the breakdown of the wallboard core material. The adhesives used in the wallboard product of the instant invention decompose very quickly and easily. Thus, the improved wallboard of the present invention provides a lightweight, strengthened, fire retardant, whitish-covered Perlite wallboard with environmental improvements that is competitively priced to traditional gypsum wallboard products.

DETAILED DESCRIPTION OF THE INVENTION

The strengthened core of the improved wallboard of the instant invention contains gypsum at up to about 60% volume by weight of the total weight of the slurry, and expanded Perlite in the range of 0.5% to 60% volume by weight of the total weight of the slurry, and more preferably in the range of 0.5% to 47.5% volume by weight of the total weight of the slurry.

In a quest to find the optimum particle size of Perlite for use in a lightweight wallboard of the present invention, it was discovered that not just any ore was or could be utilized to expand to the preferred finished expanded product or mineral. The benefit of a good ore for expanding Perlite is key to the end result, with processing playing a major role. Crushing the ore to uniform particle size in the perspective sieve or screen size and drying to proper hydration in the expander strongly affect how the perlite expands and to what final size. Perlite ore varies in consistency and grade with a variety of textures that appear to be related to the depth and type of emplacement in the perlitic dome. The lighter weight, near-surface pumiceous grades of a very friable nature do offer low expanded weight when expanded, but its pronounced friability during milling and handling make its usefulness somewhat limited. Although it is lightweight when expanded, its low density and thin fragile walls cause it to break under pressure. This pumiceous material does not have sufficient compaction resistance for strength development in the core of the present invention. The more dense ores of a granular or classical concentric texture are preferred for expanding to a lower density without compromising compressive strength. By varying furnace input specifications (i.e., temperature from 1000° F. to 2100° F., rate of CRE flow, particle sieve size distribution, and internal moisture content of ore), perlite will expand to intermediate density with a relatively coarse cell wall structure making it suitable for use in the core of the present invention. Thin section studies of expanded Perlite particles reveal the internal structure to be quite variable depending on the source. Some perlites are considered hard and have a high compaction resistance, while others are considered soft and have low compaction resistance. Lab testing has proven that Perlite in the middle of the range of what is considered to be hard or soft ore (as determined by the field geologist) listed above are most preferred in order to maintain as low as possible the expanded density and weight of their preferred Perlite.

The preferred composition of the improved wallboard product of the present invention includes a starch, boric acid, vinyl acetate emulsion, perlite, and gypsum. It has been found that this combination (in the proportions set forth below) offers the best results for weight, strength, setting and bond of the wallboard core. After applying and analyzing a wide variety of adhesives by themselves and in combination with one another, it was determined that a binder having this composition would allow the wallboard to perform as closely to what is currently used while adding strength and reducing weight. The combination of starch, boric acid and vinyl acetate in itself is sufficient to bond the Perlite together in producing the composite core of the instant invention. However, the combination of gypsum and perlite in the formulation of the improved wallboard product of the instant invention, in comparison to other cementious materials, is preferred due to excellent compatibility of the components listed above.

Optionally, an improved wallboard cover material consists of a manila colored moisture resistant paper face sheet in the range of 40–50 pounds with an altered top ply. In traditional wallboard structures incorporating a cover material composed of recycled paper pulp, the length of fibers in the cover material is between ½ and ¾ inches. The instant invention, however, employs a top ply sheet composed of virgin fibers of 1 inch or greater. While papers incorporating fiber lengths of greater than 1 inch have been produced in the past, to the best of the inventor's knowledge, no such virgin pulp has been applied previously to the top ply cover sheet of a wallboard sheet. Thus, the inclusion of such extended length fibers into the wallboard cover sheet of the instant invention provides the unforseen and unobvious benefit of providing a much stronger break strength than previously known wallboard structures.

The unique application of the optional spec paper cover sheets of the wallboard of the present invention is completely formed by any well known paper forming process. Using 100 percent "virgin stocks" for the top ply of the face paper cover sheet allows for predictable liner strength while also eliminating some of the clays and fillers associated with current completely recycled wallboard paper. By integrating a virgin pulp top ply with existing recycled wallboard paper plies, increased strength and wet handling characteristics are achieved. First, a paper cover sheet is made generally comprising a multiply sheet manufactured on a cylinder machine. Conventional sizing compounds are added to selected vats such as rosin and alum to internally size some or all plies. The plies are removed and laminated to form an essentially unitary web of paper. After being dried, the paper is coated with a water emulsion of the synthetic size of the class consisting of certain substituted succinic acid anhydrides, certain substituted glutaric acid anhydrides and the reaction product of maleic acid anhydrides with an internal olefin. This process allows for effective absorption into the bond liner of the core side of the paper to provide a mechanical linking of the paper to the composite core.

If bituminous or waxy water-repellent materials are used, they comprise from about 1.0 percent to about 10 percent of the Perlite weight by volume. These materials may be applied to the Perlite from molten states or as emulsions. If silicone emulsions are used, the silicone comprises from about 0.01 to about 2 percent of the Perlite by weight. The silicone emulsions may be applied directly to the Perlite as it exits the expander by means well known in the art.

A compatible fire retardant, such as boric acid, zinc borate, sulfamates, diammonium phosphate, nitrogen compounds, antimony oxide, silica, titanium oxide, zircon and others can be used and comprise from about 0.15 percent to about 3 percent by weight of the board. These fire retardants can be added to the formulation by powder or solution during the slurry mixing process, and also by spraying onto the paper covering for the purpose of fire retarding the laminate covering paper of the wallboard. The examples of applying fire retardants are listed as follows:

Example 1 (Fire retardant, moisture resistant system): this system sprays fire retardant solutions directly onto the board as it leaves the cascade sections and enters the take off area of the manufacturing equipment. This is accomplished by using spray heads overhead together with switch activators to trigger the action as the board passes by on the conveyor. Additives are supplied by storage tanks and pressure type discharge systems. The additives are sprayed directly on the face paper.

Example 2 (Fire Retardant): another way to apply a fire retardant quality to the paper is to add it in dry form during the Krafting process of the paper's manufacture. Small particle distribution of fire retardant are added to the pulp slurry prior to extrusion into the paperboard. This allows for the fire retardant to be completely integrated into the paper. This fire retardant could be zinc borate, antimony oxide, nitrogen compounds or sulfamates (sulfer compounds). These are all common fire retardants in paper. The moisture resistance element must still be sprayed on using the configuration described above in example 1. Furthermore, the composite core may also be fire retardant treated during the mixing process with the addition of compatible fire retardants into the slurry during the mixing process.

The binder of the instant invention is especially selected for the property of permanent tackiness in the dry state. Preferably, a self-crosslinking permanently tacky polymer, such as a vinyl acetate emulsion, is used.

It is important to note that the unique adhesive technology that is described below is completely new and unobvious to the manufacture of wallboard products. This process adds a synthetic variable into an already well-used natural adhesive formulation of starch and borate. When starch is treated with borate, interchange linkages are formed throughout the borate anion structure resulting in modifications of the physical properties of the polymer system. The overall result is a binder which, during the wallboard manufacturing process, undergoes a chemical change which provides for complete crosslinking between the starch, borate, and synthetic adhesive to form a strengthened web for gripping the gypsum and perlite and forming a rigid core.

Cross-linking of the binder utilized in the present invention with the starch polymer chain is brought about through boron or the use of boric acid. it was originally believed that the commonly used compound boric acid was a sufficient source of boron for the process of the present invention to cross-link the hydroxyl groups of the starch with the vinyl acetate emulsion branch polymer chains. However, large scale test runs of the wallboard of the instant invention revealed an occasional high water demand when standard technical grade ortho boric acids were used, as is common in wallboard production. These fluidity problems were taken back into the laboratory where extensive testing was performed. The pH of the boric acid (6.1 in 0.1% solution) and its low molecular weight were found to be causing some fluidity decrease and viscosity increase in slurry formation. In these circumstances, the solution is to replace the boric acid with sodium tricarbonate pentahydrate (5 mol) or sodium tetraborate decahydrate (10 mol). The amount of borax or boric acid should be limited in the range of not higher than 0.35% of the total wet weight of the final slurry, as it has been found that higher concentrations can cause gelling of the polyvinyl acetate emulsion and affect strength.

Currently, Perlite is used as a filler or additive to take up space in traditional gypsum wallboard compositions. However, the instant invention utilizes the expanded mineral Perlite as part of the composite, adding strength to the core as the binder grabs onto the Perlite. Starch and borate are often added to the traditional wallboard composition in order to protect the delicate gypsum crystals and to ensure proper crystal growth of the gypsum constituent of the wallboard core as the wallboard is heat treated in a drying kiln at extreme temperatures. However, as mentioned above, starch and borate also combine to form a natural adhesive. When starch is treated with borate, interchange linkages are formed throughout the borate anion structure resulting in modifications of the physical properties of the polymer system.

Traditional gypsum compositions do not require an additional binder to give the wallboard strength, but rather rely on gypsum crystal growth brought about by heat treatment of the wallboard in its final manufacturing stage. Thus, traditional gypsum wallboard compositions do not rely on the adhesive nature of the combination of starch and borate.

The wallboard composition of the present invention, however, does require an additional binder. It has been found that adding another polymer, namely a vinyl acetate emulsion, to the starch polymer and boric acid enables a cross-linking to occur between the three constituents. By crosslinking the synthetic polymer chain with the starch and borate polymer chain, more extensive chemical changes are brought about. On a molecular scale, the polymer chain branches extend in all directions, attaching to the gypsum and perlite and increasing the overall strength of the board.

By introducing vinyl acetate, polyvinyl acetate copolymer, or a vinyl acetate-ethylene copolymer, the resultant complex molecule is much larger, extending its various branches in all directions. It is this desirable change in the polymeric structure of the molecule to a more highly branched chain polymer of higher molecular weight that produces an adhesive with increased viscosity, quicker tack, and better fluid properties. These qualities are crucial to the strength of the most preferred embodiment of the invention. Listed below are two main benefits of this polymer adhesive system. First, increased flexural and compressive strength is realized over current gypsum wallboard ASTM standards. Secondly, the unique polymer adhesive composition of the instant invention enables a wallboard composition that is up to as much as fifty percent lighter than current gypsum wallboard.

Vinyl Acetate Polymers (VAP) separately and in combination with the other previously mentioned adhesives are also found to produce very favorable test samples and test results. The VAP utilized is a milky white liquid, with typical characteristics in the range of a melting point of 32° F. to 39° F., a vapor pressure of 16 mm Hg to 22 mm Hg (68° F. to 70° F.), specific gravity of 1.0 to 2.0, vapor density of from less than 1 to 1, a boiling point of from 212° F to greater than 212° F., and the VAP is water miscible.

In general, VAP's are hard, brittle, yet tough resins which are found overall to be favorable to the wallboard installation process which requires that the wallboard have the ability of being cut and cleanly snapped with a common utility knife after the board has been scored. Additionally, each of the various vendor-supplied VAP's that were tested, when combined in the unique percentages of gypsum and perlite samples tested, were found to be environmentally friendly and not noxious during heat testing. Further, each of the VAP formulations available clearly exhibited the cross linking with starch and boron (through the use of boric acid), whereby a fusion occurred between the minerals and the adhesive composition. It is thus firmly believed that a chemical fusion of organic and inorganic elements in the composition of the instant invention occurs, rather than a mere adherence by the binder to the mineral. Thus, a fusion occurs which results in a chemically changed binder combination which, when heated, in turn chemically fuses the wallboard formulation.

Wide ranges of polyvinyl alcohols (PVAls) which can be made are directly dependent upon the characteristics of the intermediate polyvinyl acetate (PVA), especially the PVA's molecular weight and hydrolysis process. PVAl's are generally classified by the percentage of hydrolysis and their degree of polymerization. All polyvinyl alcohols will work in the instant application which are hydrolyzed in preferable ranges from 80 to 100%. Their degree of polymerization based on viscosity at approximately 20° C. of 4% aqueous solution, in the range of 5 cP (low viscosity) to 60 cP (high viscosity) will work in the application. The degree of polymerization of grades which work are in the range of 500 to approximately 2500. The specific PVAl chosen, including the viscosity of the final polyvinyl acetate emulsion, or the derivative of PVAl chosen, shall be field lab or field trial selected. It is primarily dependent on the chemical composition of the gypsum ore, the chemistry of the metered water, and to a significant extent the overall chemical makeup of the constituent additives together. As the temperature increases in the metered water or plant conditions, solubility increases. The fluidity of the wet gypsum slurry finally produced can be directly effected by the proper selection of the PVAl and the final PVA emulsion. Low molecular weight (ca 70–80%) PVAl hydrolyzed grades dissolve rapidly in water at normal room temperatures. It should be noted that solutions of PVAl's or in vinyl acetate emulsions mix and disperse more readily in wallboard production. They also perform better against "clay shock," as discussed elsewhere in this specification. High molecular weight PVAl's (ca 95–100%) hydrolyzed grades will generally exhibit higher tensile strength. Higher molecular weight PVAl's are dissolved by dispersing in cold water and heating to approximately 80–90° C. with stirring. Middle range molecular weight (ca 80–95%) grades through hydrolysis are dissolved through slow addition to cold water with stirring, although the temperature can then be raised to 60–80° C. to hasten the process.

All VAP's including vinyl acetate homopolymers and copolymers tested were found sufficient to cross-link with starch and boric acid and perform quite satisfactorily in wallboard applications. VAP emulsions exhibited preferable mixing ease, dilution and dispersion in the metered process water, and into the final wet gypsum slurry. Homopolymer emulsions were found quite favorable due to their lowest cost, their rapid setting speed, their good ability to adhere to difficult surfaces, and their "dried" strength. Emulsion homopolymers and copolymers, containing polyvinyl alcohol (PVAl) at the right percentages and molecular weight tested, increase the adhesion and cohesion strength, and increase the stabilization (thus the site storage ability) of the final vinyl acetate polymer.

Lower molecular weight polyvinyl alcohols (PVAl's) worked better in the presence of sizable clay percentage gypsum ores (i.e., above 1%), to enable initial less thickening of the final wet gypsum with perlite stucco. Higher molecular weight PVAl's increase the absorption of binder molecules onto the particles of the clay minerals or flocculation of clay particles producing in effect "clay shock." The correction for this phenomenon is to utilize lower molecular weight PVAs that are partially polymerized and hydrolyzed. Thus in essence, they are less "prepared" PVAs. Partly hydrolyzed grade PVAs such as GL-02 polyvinyl alcohols of zero to approximately 35 percent to water concentrations should be utilized or added as an anti shock agent, where there is a fairly sizable presence (i.e., above 1%) of clays in the gypsum, or in the presence of sizable clay percentages (i.e., above 0.1%) in the recycled wallboard paper being utilized.

The inventor herein has recently discovered a phenomenon that occurs when polyvinyl acetate (PVA) emulsion is added to beta hemi-hydrate gypsum in the practice of the instant invention, and a solution to correct this phenomenon, as follows. When PVA is introduced into the standard wallboard manufacturing apparatus, slurry thickening occurs in the pin mixer as the constituents are combined, in turn causing an increase in viscosity which creates an increased water demand to maintain or regain a proper fluidity in the slurry. The increased water demand is a problem in that more energy is required to drive off the excess moisture, and strength is also compromised. The following is an example of post addition of lower molecular weight polyvinyl alcohol (PVAl) to the PVA emulsion before introduction into the pin mixer under conventional wallboard line manufacturing production in order to reduce or altogether eliminate the clay shock or thickening phenomenon. A 10% to 25% solution of PVAl and water (the specific concentration depending upon the severity of the thickening and being easily determined upon inspection during production) is mixed to batch with the PVA emulsion. The 10% to 25% solution of PVAl to water is provided in the amount of approximately 0.1% to 30% by weight of the PVA emulsion, and can be blended together until a homogenous mix is obtained. The above procedure is practiced prior to the emulsion being utilized in the process of this invention, and the two constituents can be recirculated together to combine once the PVAl is placed into solution. Too much PVAl can affect strength and can cause hydration problems in the system, so the proper ratio is essential. It is particularly of note that due to the siliceous nature of some gypsum deposits, the 10% solution of PVAl may not be sufficient at 5% of the PVA to solve the thickening issue, such that higher concentrations of PVAl would be required to solve the problem. Again, the precise concentration may be easily determined upon inspection during production of the wallboard of the instant invention. In addition, a small amount of Sorbitol (between 0.1% and 5%) in approximately 70% solution can act as a vehicle for the gypsum to attach to instead of attaching to the polyvinyl alcohol contained within the PVA emulsion itself. This is the purpose of post adding the lower molecular weight PVAl to the PVA emulsion, namely, to counteract the reaction causing the thickening allowing more PVAl to react with the gypsum. It is believed that the chemical reaction that occurs when PVA is added to the stucco can be countered with the post addition of the lower molecular weight PVAl. While it would be most preferable to blend the PVA with the lower molecular weight PVAl at the emulsion manufacturing site so as to be ready to use when received at the wallboard manufacturing facilities, the current need of evaluating the thickness of the slurry during wallboard production to establish the appropriate concentration requires that the two constituents be combined at the wallboard manufacturing facility.

Thickening of the final gypsum/perlite slurry can be corrected or further corrected through other methods. One simple solution is to utilize oxidized starch in the presence of PVAls or PVAs. Further improvements in fluidity will occur when waxy oxidized starch is used. The type of starch used, or preferred, is discussed in other parts of this specification. Higher-grade starches will produce better reactions and strength results, and should be weighed in terms of total cost in determining the final selected and prepared PVAl and PVA copolymer or homopolymer emulsion utilized.

It has been known to use sugar, such as low cost beet sugar, which is added to the edge sections of de-foamed gypsum stucco, to ultimately harden the edges of finished wallboard. The present invention also employs the optional use of a relatively small percentage of specific low cost sugars in the wallboard formulation in order to increase overall core ASTM strength tests and further reduce cost.

Further, certain sugar solutions, premixed with the preferred adhesives, provide another option towards determining optimal strength and plasticity of the combined low cost tacky compound. However, the effect of sugar addition was generally found to lower the overall cohesion of the selected adhesives. Therefore, there is a tradeoff of cost versus optimum cohesion performance, which must be determined by the manufacturer. Dryer sugar solutions such as beet sugar, or other typical current wallboard sugars utilized today, should be introduced separately from the adhesives in the final stage of the pin mixer, as they tend to react with the adhesive adversely. Making the board composite flexible or more plastic was improved over conventional methods, yet not as improved as when utilizing the preferred adhesives. Thus, cost reduction with similar edge or possible nail pull performance remained the main improvements by utilizing sugars of low appropriate percentages, in the presence of the preferred selected adhesives previously mixed with the other wallboard ingredients.

The particular type of board starch utilized is yet another important consideration. Starches, or more specifically white dextrins, are commonly utilized in gypsum wallboard production to provide a better interface between the paper and the core and to protect the gypsum crystal during drying of the board, as well as to allow for increased paper bond. A large number of dextrin grades can be utilized from lower grade cereal flour to high grade very thin boiling starches which are acid treated. Gelling and flow properties as well as compatibility are better in the higher-grade starches produced from dent corn. The quantity utilized in standard wallboard production can range anywhere from 5 to 12 pounds per thousand square feet (MSF). Typically this range is from 0.20 to 0.50 percent of the wet board weight (MSF). Testing conducted in the laboratory showed better resulting strength development using the formulation of the present invention and starch in the range of 0.30 to 0.75 percent by weight (MSF) in combination with the synthetic binder. Higher grade acid modified starches worked well in combination and to cross-link with the vinyl acetate emulsion. Further testing revealed other types of starches, including oxidized thin boiling starches, worked well if not better than acid modified starches. In some situations, oxidized starches are highly compatible with vinyl acetate emulsions as are acid treated starches. But in situations where the gypsum stucco has clay impurities, the oxidized starch can grab onto the vinyl acetate emulsion and block flocculation of clay particles with the polyvinyl alcohol, virtually eliminating "clay shock" and viscosity problems experienced in formulations where clay shock occurs. Although slightly higher in cost, oxidized starches are believed to be the least expensive and simplest solution in these clay situations. The gelling and fluid characteristics of starch play a larger role in the formulation of the present invention than in standard wall board formulations. Instead of the majority of the starch migrating to the face to protect the core to paper bond, much of the starch is retained in the core to chemically combine with the synthetic additive to fuse the minerals together. This cross-linking of the starch and synthetic additive is key to the strength development of the core of the lightweight wallboard of the present invention. In all tests, the higher grades, meaning flash dried, wet milled modified starches gave the best results in nail pull and flexural strength ASTM testing procedures over the lower grade, dry milled, belt dried starches requiring less processing than higher grade starches. The use of more intensely processed starches is somewhat a factor to consider in determining the optimum final wallboard costs.

It was also found favorable to raise the glass transition temperature ($T_g$) for better fire testing results of the samples tested. A higher fire rating using VAP's would certainly be preferred in wallboard construction applications. The $T_g$ range from 28° C. to 39° C., with higher $T_g$ being preferred, were examined during fire tests, and yet all were found acceptable. In order to obtain higher transition temperatures (Tg), other copolymers may be prepared and/or pre-added to the emulsion in smaller quantities, such as 2-ethyl hexylacrylate, ethyl acrylate, dibutyl fumurate, vinyl stearate, polymethyl methacrylate, or butyl methacrylate. Cost should be considered in percentages used as these will generally increase the overall modified polymer emulsion cost.

As mentioned above, it is a significant feature of the instant invention that the manufacture of the synthetic adhesive binder incorporated into the Examples provided below is carried out at the wallboard production facility, as opposed to being manufactured offsite and later transported to the wallboard production facility. More particularly, for the examples provided below, the base components of the binder are acetic acid and ethylene which make up a vinyl acetate homopolymer, which in turn is polymerized with a vinyl acetate monomer. The process by which this occurs and the equipment needed to accomplish the polymerization of the above-listed constituents is located at the site of the wallboard manufacturing facility to significantly reduce costs.

The manufacture of the polyvinyl acetate emulsion containing polyvinyl alcohol at the wallboard manufacturing facility provides many distinct advantages. The cost of the emulsion is reduced in the weight and transportation cost of the main individual components. Much experimentation and field testing have confirmed that the final PVA emulsion for the application in wallboard should be accurately optimized. PVA emulsions have been made for other applications, but have not been used in wallboard manufacturing before. Accelerators, strengthening agents, percentages of PVA and PVAl's, proper end foam generation controls, additives, and stabilization requirements can be uniquely controlled for optimization in wallboard usage. Also, important to factor in is the fact that the more expensive cost requirements to stabilize and protect from bacteria the final PVA emulsion transported are reduced, because the PVA emulsion created is continuously used in the manufacture of the wallboard. Also, a consistent quality controlled source of supply is always readily available. Climate conditions (such as winter freeze problems that adversely affect PVA performance), potential contamination of the product in multiple handling, premature agitation which can effect strength performance, and storage buildup of the dried emulsion can be reduced and therefore lower overall cost of the PVA emulsion.

Further, newer improved manufacturing techniques to make PVA emulsions can be employed and master linked computer controlled to optimize production quality and capacities immediately required for the changes in the wallboard formulations of the various sized and types of wallboard products.

The making of vinyl acetate (VA), vinyl acetate polymers (VAP's), and vinyl acetate monomers (VAM's) onsite at the wallboard manufacturing facility further lowers the cost at the volume usage demanded for wallboard applications. VAM's and the elements that make up VAM's, which are key base compounds of VAP's, are determinative factors in the ultimate cost of the wallboard manufacturing process. Thus, using the processes and placing the equipment designed to manufacture VAP's at the wallboard manufacturing facility plays a substantial role in lowering the ultimate production cost of VAP's.

Still further, the stability of a colloidal suspension of vinyl acetate in emulsion is determined by the length and time the emulsion must sit or be unutilized. The longer the emulsion must be "stabilized," the higher the cost of the emulsion. Therefore, lower costs are realized through the continuous use of the emulsion promptly after it is prepared, as in the continuous wallboard manufacturing application of the instant invention where the adhesive is manufactured on-site.

It has been discovered by the inventor herein that the selected binder can be modified or slightly altered when mixed vigorously enough with processed water to foam. The foamed binder can aid in aerating the board and decrease or even eliminate the need for soap foaming agents currently used to aerate wallboard in manufacturing. This in turn reduces the cost of the wallboard manufacturing process by reducing the need for soap foaming agents. It is believed that soap bubbles and soaps in general do nothing for and actually tend to diminish the strength of the ground gypsum, perlite particles and/or other dry constituents from bonding or cohering to each other and then to the wallboard paper plies. Soaps used today do not aid in sticking or gluing particulates together but separate or repel them from doing the same. Therefore, the binder need be of proper combination and viscosity to form the proper sized bubbles and remain reasonably constant through the kiln drying process to properly aerate the finished wallboard. Polyvinyl acetate emulsions properly selected when mixed properly with water, similar to soaps, will foam and can produce a stronger same size bubble. The binder or emulsion can be slightly altered in viscosity by adding other binders or foaming agents to enhance proper sized bubbles that react similarly, yet firmer, than soap bubbles. Additionally, the binder or emulsion can be pre-mixed with the starch in solution to further enhance or control the foaming presence. The most important difference however from just using soap foam water is that the final combined binder solution bubbles will grab onto and adhere to the gypsum, perlite or expanded mineral, and other dry ingredients in the pin mixer and then grab onto the board paper to form more bonded, firm, and therefore stronger composite wallboard.

Compared to the high costs associated with locating synthetic gypsum plants next to power plants, and given present manufacturing labor expenses at a traditional gypsum production facility, the manufacture of the final synthetic binder at the production site exhibits significant reduction in production costs. Traditionally, synthetic wallboard energy costs are significantly reduced through the industry practice of contracting with power plants to dispose of some of the waste produce by the power plant by using it as a constituent of the synthetic wallboard, in exchange for reduced costs in the supply of electricity. Therefore, the energy costs associated with the manufacture of the adhesives at the site of the wallboard manufacturing facility are significantly reduced. Further, the presence of manufacturing labor at the wallboard manufacturing facility, which labor can likewise manufacture the adhesives, reduces the total number of employees required to manufacture the adhesives, once again reducing the overall manufacturing costs. The additional development or polymerization of other adhesives manufactured on site will additionally reduce production costs. The labor and energy required to transport the amount of adhesive material needed to manufacture mass quantities of wallboard from a location other than the site on which the wallboard is manufactured would not be logistically or financially feasible in a large production setting.

Fire Retardant additives to the adhesives, such as the addition of boric acid, reduce the overall flash point of these chemicals and therefore increase the fire rating of the core composite. Under fire rating test samples, the presence of noxious fumes were greatly reduced even to the point of being virtually eliminated as the samples moved away from the epoxies and non-water solvent adhesive mixtures. The combination of vinyl acetates with cementious materials also provided a good fire retardant combination without the addition of boric acid.

EXAMPLES

The following examples employing the instant invention proved to bring very favorable test results.

Example 1

The following is an example of post addition of polyvinyl alcohol to the formulation of the instant invention. A 6 inch by 6 inch by ½ inch sample is prepared using the following formulation:

| Materials | Weight in Ounces | Weight by Percentage |
|---|---|---|
| Gypsum | 5.80 | 45.224 |
| Perlite | 0.30 | 2.339 |
| Board Starch | 0.05 | 0.389 |
| Accelerator | 0.03 | 0.233 |
| Boric Acid | 0.01 | 0.077 |
| Vinyl Acetate | 0.30 | 2.339 |
| Polyvinyl Alcohol | 0.035 | 0.272 |
| Lignosite (dispersant) | 0.10 | 0.779 |
| Ethoxysulfate (soap) | 0.10 | 0.779 |
| Water | 6.10 | 47.569 |

First, the dry constituents, gypsum, perlite, board starch, accelerator, and boric acid are blended until a homogenous mixture is obtained. Next, in a separate vessel, the vinyl acetate and polyvinyl alcohol and dispersant are mixed together with ⅔ of the total water and the remaining ⅓ of the total water is combined with the soap foaming agent and blended to achieve ¼ inch diameter bubbles of foam. Finally, all of the constituents are combined in a laboratory mixer and blended until 100% of a slurry is obtained. The slurry is then poured into a paper envelope comprising standard wallboard cover sheets and formed and sealed. After hydration occurs, the sample is placed into a small laboratory kiln to drive off the excess water and dry the wallboard example.

Example 2

It has been found that sodium trimetaphosphate may be utilized in the amount of 0.01% to 10% by weight, and more preferably from 0.01% to about 0.7% by weight, to increase compressive strength by enhancing cylindrical needle-like crystal growth in the core of the improved strengthened wallboard of the instant invention. Sodium trimetaphosphate is a combination of earth metals and is known by the chemical equation $(NaPO_3)_3$. This compound may be added to the slurry either in solution or in a dry powder state, although in solution is preferred. By adding sodium trimetaphosphate into the system, the favorable long cylindrical crystal growth that adds the most strength to the core of the wallboard and also enhances the paper to core bond is greatly increased, and the result is higher compressive strength. The compound is highly water soluble and dilutes very quickly allowing it to disperse very rapidly. The resultant chemical reaction is not entirely understood, although it is believed that the sodium hydroxide and fluoride reacts with the calcium and increases the crystals growth.

The following is an example of the addition of sodium trimetaphosphate to the formulation of the instant invention. A 6 inch by 6 inch by ½ inch sample is prepared using the following formulation:

| Materials | Weight in Ounces | Weight by Percentage |
|---|---|---|
| Gypsum | 6.70 | 47.857 |
| Perlite | 0.25 | 1.785 |
| Board Starch | 0.05 | 0.357 |
| Ball Mill Accelerator (bma) | 0.02 | 0.142 |
| Boric Acid | 0.005 | 0.035 |
| Vinyl Acetate | 0.15 | 1.071 |
| Polyvinyl Alcohol | 0.03 | 0.214 |
| Sodium Trimetaphosphate | 0.095 | 0.678 |
| Ethoxysulfate (soap) | 0.10 | 0.714 |
| Lignosite (dispersant) | 0.10 | 0.714 |
| Water | 6.50 | 46.433 |

First, the dry constituents, gypsum, Perlite, board starch, bma, and boric acid are blended until a homogenous mixture is obatined. Next, in a separate vessel, the vinyl acetate and polyvinyl alcohol and dispersant are mixed together with ⅔ of the total water and the remaining ⅓ of the total water is combined with the soap foaming agent and the sodium trimetaphosphate and blended to achieve ¼ inch diameter bubbles of foam. Finally, all the constituents are combined in a laboratory mixer and blended until 100% of a slurry is obtained. The slurry is then poured into a paper envelope comprising standard wallboard cover sheets and formed and sealed. After hydration occurs the sample is placed into a samll laboratory kiln to drive off the excess water and dry the wallboard sample.

I claim:

1. A slurry composition suitable for use in the manufacture of construction grade wallboard comprising:

expanded perlite present at about 0.5% up to about 47.5% by weight of the total wet weight of the slurry;

calcium sulfate;

a vinyl acetate emulsion comprising a homogeneous blend of suspended polyvinyl acetate particles in polyvinyl alcohol and water; and a solution comprising a 10% to 25% solution of polyvinyl alcohol to water, said solution being present in said composition in an amount of approximately 0.1% to about 30% of said vinyl acetate emulsion.

2. The composition of claim 1, further comprising:

sodium trimetaphosphate present at about 0.01% up to about 10% by weight of the total wet weight of the slurry.

3. A slurry composition suitable for use in the manufacture of construction grade wallboard comprising:

a dry powder mineral substrate selected from the group of minerals consisting of calcium sulfate, perlite, and combinations thereof;

a synthetic binder comprising a vinyl acetate emulsion, starch, and a boron source; and a solution comprising a 10% to 25% solution of polyvinyl alcohol to water, said solution being present in said composition in an amount of approximately 0.1% to about 30% of said vinyl acetate emulsion.

4. The composition of claim 3, further comprising:
sodium trimetaphosphate present at about 0.01% up to about 10% by weight of the total wet weight of the slurry.

5. A method of manufacturing a construction grade wallboard product comprising the steps of:
forming a first mixture by adding a first solution comprising a 10% to 25% solution of polyvinyl alcohol to water to a vinyl acetate emulsion comprising a homogeneous blend of suspended polyvinyl acetate particles in polyvinyl alcohol and water, such that said first solution is present in said first mixture in an amount of approximately 0.1% to about 30% of said vinyl acetate emulsion;
forming a second mixture by adding a mineral selected from the group consisting of calcium sulfate, perlite, and combinations thereof, to said first mixture;
combining said second mixture with a suitable amount of water;
gradually preparing a slurry by mixing and stirring said second mixture and said water to form a slurry;
enveloping said slurry between two paper cover sheets to form a wet board; and
drying said wet board at a temperature in the range of 75° C. to 325° C.

6. The composition of claim 1, said calcium sulfate being present in an amount not in excess of about 60% by weight of the total wet weight of the slurry.

7. A construction grade wallboard comprising:
a core formed from a slurry composition, said slurry composition further comprising:
expanded perlite present at about 0.5% up to about 47.5% by weight of the total wet weight of the slurry;
calcium sulfate;
a vinyl acetate emulsion comprising a homogeneous blend of suspended polyvinyl acetate particles in polyvinyl alcohol and water; and
a solution comprising a 10% to 25% solution of polyvinyl alcohol to water, said solution being present in said composition in an amount of approximately 0.1% to about 30% of said vinyl acetate emulsion; and
paper cover sheets sandwiching said core.

8. The construction grade wallboard of claim 7, said calcium sulfate being present in an amount not in excess of about 60% by weight of the total wet weight of the slurry.

9. The construction grade wallboard of claim 7, said slurry composition further comprising:
sodium trimetaphosphate present at about 0.01% up to about 10% by weight of the total wet weight of the slurry.

10. A construction grade wallboard comprising:
a core formed from a slurry composition, said slurry composition further comprising:
a dry powder mineral substrate selected from the group of minerals consisting of calcium sulfate, perlite, and combinations thereof;
a synthetic binder comprising a vinyl acetate emulsion, starch, and a boron source; and
a solution comprising a 10% to 25% solution of polyvinyl alcohol to water, said solution being present in said composition in an amount of approximately 0.1% to about 30% of said vinyl acetate emulsion; and
paper cover sheets sandwiching said core.

11. The construction grade wallboard of claim 10, said slurry composition further comprising:
sodium trimetaphosphate present at about 0.01% up to about 10% by weight of the total wet weight of the slurry.

12. A construction grade wallboard comprising:
a core formed from a slurry composition, said slurry composition further comprising:
a dry powder mineral substrate selected from the group of minerals consisting of calcium sulfite, perlite, and combinations thereof;
a vinyl acetate emulsion comprising a homogeneous blend of suspended polyvinyl acetate particles in polyvinyl alcohol and water; and
a solution comprising a 10% to 25% solution of polyvinyl alcohol to water, said solution being present in said composition in an amount of approximately 0.1% to about 30% of said vinyl acetate emulsion; and
paper cover sheets sandwiching said core.

13. The construction grade wallboard of claim 12, said slurry composition further comprising:
sodium trimetaphosphate present about 0.01% up to about 10% by weight of the total wet weight of the slurry.

14. The construction grade wallboard claim 12, wherein said vinyl acetate emulsion is present at about 0.00% to about 40% by weight of the total wet weight of the slurry.

15. The construction grade wallboard of claim 12, wherein said polyvinyl alcohol is present in said vinyl acetate emulsion at about 0.10% to about 30% of said vinyl acetate emulsion.

16. The construction grade wallboard of claim 12, wherein said polyvinyl alcohol is about 80% to about 100% hydrolyzed.

* * * * *